United States Patent
Rogers et al.

[15] 3,665,716
[45] May 30, 1972

[54] REFUSE DISPOSAL METHOD

[72] Inventors: Z. W. Rogers, P.O. 12247 Waldeman Drive, Houston, Tex. 77077; William L. Kirk, P.O. Box 8702 Ruthby, Houston, Tex. 77017

[22] Filed: Aug. 10, 1970

[21] Appl. No.: 62,334

[52] U.S. Cl. ................................................................61/35
[51] Int. Cl. ..................................................................E02d
[58] Field of Search........................61/35, 36, .5; 166/305 D; 100/229 A, 39; 55/279; 71/9, 10

[56] References Cited

UNITED STATES PATENTS

| | | | |
|---|---|---|---|
| 2,594,054 | 4/1952 | McNamara et al. | 100/91 |
| 3,236,053 | 2/1966 | Billue | 61/.5 |
| 3,557,685 | 1/1971 | Schroering | 100/39 |
| 3,136,608 | 6/1964 | Lindstrom | 71/9 X |
| 3,486,308 | 12/1969 | Burt | 55/279 X |
| 3,262,274 | 7/1966 | Nelson, Jr. | 61/.5 |
| 2,867,521 | 1/1959 | Jeffreys | 71/10 X |
| 3,013,675 | 12/1961 | Schonrock | 100/229 A UX |
| 3,379,013 | 4/1968 | Slagle | 61/.5 |

Primary Examiner—David J. Williamowsky
Assistant Examiner—Philip C. Kannan
Attorney—Pravel, Wilson & Matthews

[57] ABSTRACT

Refuse is collected, transported and then deposited in an impermeable cylindrical solution cavity formed within a subterranean rock salt formation. The air containing noxious odors and excess heat is extracted from the solution cavity purified and then released into the atmosphere.

7 Claims, 1 Drawing Figure

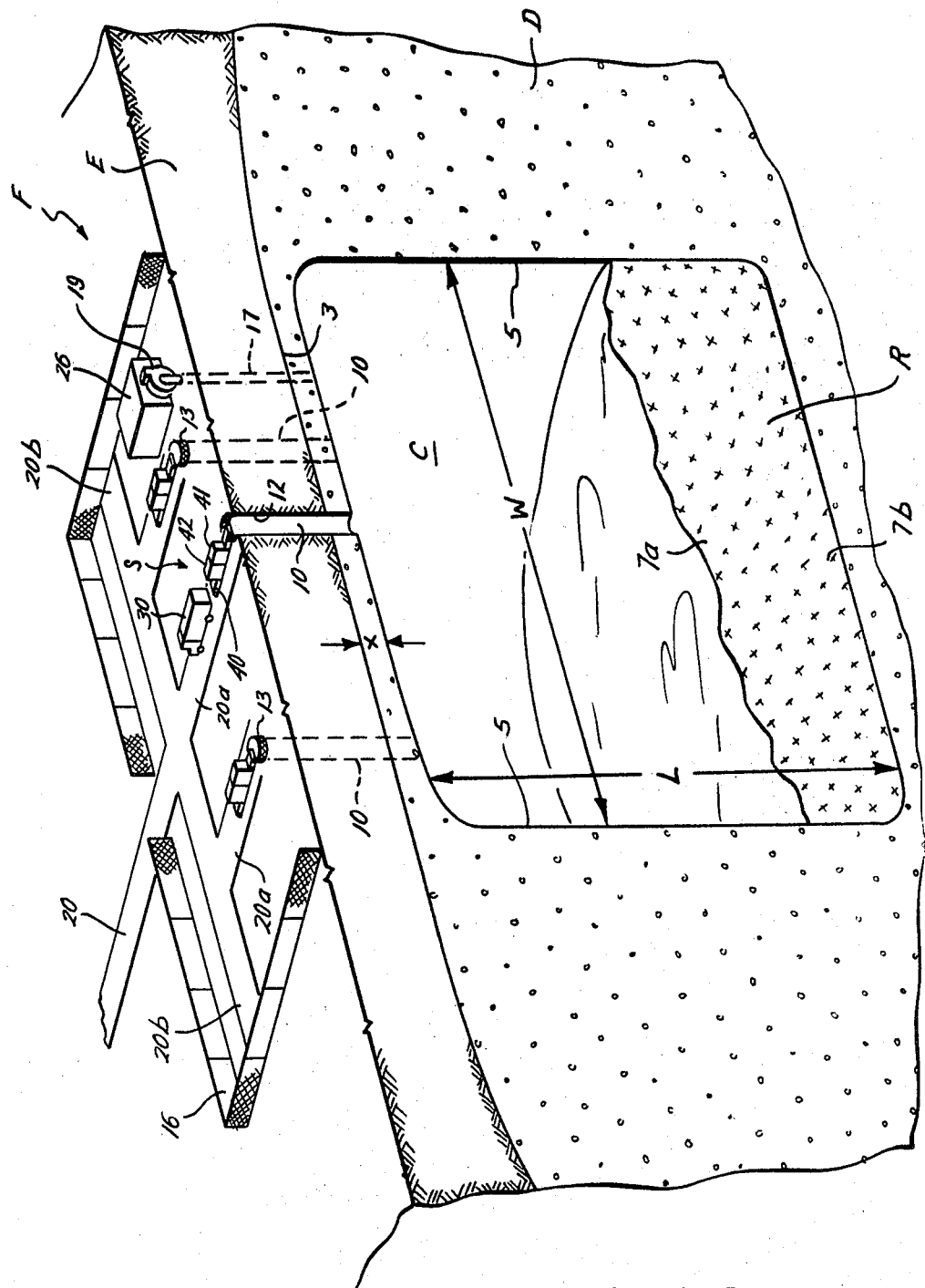
Z. W. Rogers
William L. Kirk
INVENTORS
BY
Pravel, Wilson & Matthews
ATTORNEYS

REFUSE DISPOSAL METHOD

BACKGROUND OF THE INVENTION

1. Field of the Invention

The present invention relates to processes for sanitary disposal of refuse, garbage and the like.

2. Description of the Prior Art

In the prior art, as exemplified by U.S. Pat. Nos. 1,935,090; 3,352,115 and 3,466,873, garbage and refuse was disposed of by either being placed in land fills and covered with earth, oil, foamed plastic resin and the like, by being buried and forced into soft earth, or by being burned.

Such prior art disposal methods suffered from several shortcomings, including pollution of the environment through noxious odors, smoke and spillage. Vermin such as rats, flies and the like were attracted to the disposal site, further increasing the pollution, sanitation and health problems of refuse disposal.

Additionally, relatively large land areas in the vicinity of urban municipalities had to be set aside for the disposal sites resulting in uneconomical utilization of valuable land.

SUMMARY OF THE INVENTION

With the present invention, refuse including garbage, trash, rubbish, waste matter and the like is deposited and introduced into substantially impermeable solution cavities formed in subterranean rock salt formations such as piercement salt domes, strata and the like, thus reducing the possibility of pollution, odor, smoke, spillage and the like, and of attraction of vermin and disease-carrying pests, while requiring relatively small surface land area for a disposal facility.

BRIEF DESCRIPTION OF DRAWINGS

The accompanying sheet of drawings is an isometric view, partly in section, of a refuse disposal facility according to the method of the present invention.

DESCRIPTION OF THE PREFERRED EMBODIMENT

In the drawing, the letter F designates generally a refuse and garbage disposal facility using the method of the present invention, where refuse, including garbage, waste matter, trash, rubbish and the like indicated generally by the letter R is disposed of by depositing such at a disposal station S into a substantially impermeable solution cavity C formed in a subterranean rock salt formation D. Since a typical rock salt formation, for example, a piercement salt dome, may extend for an average of one and one-half miles across a top or upper surface 3, and such upper surface 3 may be located at depths beginning substantially adjacent the earth's surface to as deep as 12,000 to 14,000 feet beneath the earth's surface, the dimensions of the facility F shown in the drawings have been altered from normal scale to more clearly illustrate the present invention, as will be more evident later.

The rock salt formation D may be a piercement salt dome beneath the surface of the earth E or other suitable naturally occuring subterranean rock salt formation such as, for example, salt beds or strata, containing rock salt or sodium chloride in relatively pure form, and has a solution cavity C formed therein by the solution cavity forming technique used to form spherical cavities for storage of natural gas and liquid hydrocarbons.

The solution cavity forming technique is well-known and is described in detail for example in an article "Use of Salt Solution Cavities for Underground Storage" in the Symposium on Salt, Northern Ohio Geological Society, 1963.

In such technique, a well is drilled from the surface of the earth E penetrating the dome D for a depth X, which may be, for example, several hundred feet. Tubing or pipes are inserted in such well, and water which is undersaturated in saline content is introduced into the dome D and controlled in its circulation within the dome D to dissolve a portion thereof and form the solution cavity C.

By controlling the circulation of the water in the dome D, the solution cavity C can be formed in a desired configuration of a desired volume.

After a desired volume and configuration of the cavity C has been obtained, the remaining portions of the undissolved salt dome D form a substantially impermeable containing wall 5 about the cavity C, and the portion of depth X of the dome D through which the well was drilled serves as a roof for such cavity providing strength and support for such cavity.

The cavity C is used in the method of the present invention for disposal purposes, and not for storage and retrieval, and thus the permanent brine injection equipment and high pressure containment equipment are not required for use with the cavity C, and the complex storing, protective and monitoring equipment and techniques proposed for the storage of radioactive material in abandoned salt mines are not needed. However, as is known in the art, if the adjacent geological formations are not sufficiently strong to support the cavity C, brine may be introduced into the cavity C to give the cavity C the required strength against collapse or deformation.

Although other configurations of cavities are suitable for use with the method of the present invention, the preferred solution cavity C is substantially cylindrical in configuration and may extend, for example, 200 feet in width or diameter W and 1,000 feet in length or vertical depth L.

It has further been determined that the cylindrical configuration of the cavity C, rather than the spherical configuration used for petroleum and gas products storage, with the relatively long vertical dimension L compared to the diameter W, allows substantially complete filling by refuse of the cavity C outwardly towards the retaining walls 5, efficiently utilizing the volume of such cavity.

The cylindrical configuration further permits an increase in disposal capability of the cavity C, due to the compressing and compacting overburden of an upper, or more recently deposited, portion 7a of the refuse R upon a lower portion 7b of such refuse, which overburden compresses and reduces the volume occupied in the cavity C by the lower portion 7b. For example, for incoming refuse R compressed in a manner to be set forth below to a density of 90 lbs. per cubic foot, a compressive stress of 62,5 lbs. per square inch for each 100 feet of refuse R contained in the cavity C is created.

One or more access shafts 10, which are for example 4 feet in diameter, are drilled or otherwise formed in the earth E and provided with a casing liner 12 to communicate with and provide access to the solution cavity C and serve as access conduits to the cavity C for introduction and depositing of the refuse R into such cavity.

A suitable fence 13 and cover or sealing mechanism 15 are provided at an upper end 10a of each of the access shafts 10 for safety purposes. The fence 13 prevents workers or persons in the vicinity of the access shafts 10 from falling into such shafts and the cover 15 closes the access shafts when such shafts are not in use.

An outer fence 16 or trees or screens encloses the facility F for beautification and safety purposes, preventing unauthorized access to such facility.

A ventilation or exhaust shaft 17, which may be for example 1 foot in diameter, is formed by drilling or other suitable techniques to connect the solution cavity C to an air pressure controlling apparatus such as an extracting fan or pump 19. The pump 19 removes air containing heat and noxious odors caused by decomposition of the refuse from the cavity C.

The pump 19 preferably extracts air form the cavity C at a rate sufficient to create a pressure differential with a reduced or sub-atmospheric pressure within the cavity C to control emission of noxious odors from the access shafts 10 and to assist in drawing the refuse R through such access shafts 10 into the cavity C.

If a sufficient volume of gas develops from decomposition of the refuse R to cause sufficient pressure within the cavity C to expel noxious odors and the like, the air pressure controlling apparatus may include bleeder or relief valves to control and regulate the air pressure within the cavity C.

The extracted or excess air is conveyed from the pump 19 to an air purification facility 26 where such air is purified by well known processes, such as those described in the textbook "Gas Purification Processes," G. Nonhebel, Editor, George Newnes, Ltd., Publisher, London (1964).

After purification, the purified air is vented or released and permitted to return into the atmosphere.

An access road 20 leads to the facility F and preferably to a plurality of the disposal stations at a plurality of unloading locations 20a. A plurality of parking or waiting locations 20b are also provided within the facility F.

The refuse R may be deposited into the cavity C directly without preliminary processing, if desired. However, such process is not desirable since recoverable portions of the refuse such as cans, etc., are deposited into the cavity and discarded, and further the volume of the cavity C is not efficiently utilized, as will be more evident below.

Each disposal station S includes a conveyor belt 40, for transporting the refuse R unloaded from a truck 30 or other refuse carrying vehicle. The conveyor belt 40 transports such refuse through a magnetic separator 42, of the well-known type, which extracts ferrous and metallic elements from the refuse being unloaded from the truck 30, to a processor 41 in the disposal station S.

To increase the disposal capacity of the disposal stations S, an additional unloading conveyor belt may be provided leading to the belt 40 and magnetic separator 42 so that a plurality of trucks may be unloaded at each of such disposal stations.

The metallic elements removed from the refuse R may be subjected to heat or fire to burn any combustible refuse inadvertently entrained in such metallic elements after they have been segregated by the separator 42, if desired.

A compressor or baler of the well-known type may be used as the processor 41, although a refuse shredder may alternatively be used, and processes the refuse R, after removal of metallic elements by the separator 42, into a bale or package or shredded pieces of refuse of suitable dimension to allow passage of such refuse through the access shafts 10, and further to increase the density and reduce the volume of the refuse R being deposited in the solution cavity C, in order to increase disposal capacity of such cavity.

The processed refuse R is transported by the conveyor belt 40 from the processor 41 to the open upper end 10a of the access shaft 10 and is deposited through such access shaft and drawn by gravitational forces into the cavity C, with the reduced pressure or subatmospheric pressure within the cavity C assisting in drawing such refuse through such access shaft into the cavity C. A tamper, bar, rod or other suitable apparatus may be provided to dislodge any of the refuse should such refuse become inadvertently stuck or jammed in the access shaft 10.

Aerobic and anaerobic bacteria are introduced into the cavity C through the access shafts 10 to assist in the decomposition of the refuse R deposited in such cavity, and to reduce the volume of the cavity C occupied by such refuse R.

OPERATION

The refuse transporting trucks 30 enter the disposal facility F via the access road 20 and if all disposal stations S are occupied, such trucks are driven to the parking location 20b to await unloading.

When a disposal station S becomes available, the truck 30 is driven to such station, and the refuse R on such truck is unloaded onto the conveyor belt 40 and transported through the magnetic separator 42 where metallic elements such as cans, etc. are removed from such refuse.

The remainder of the refuse R is then passed into the compressor 41 where it is compressed and packaged into bales and thereafter transported to the open upper end 10a of the access shaft 10. The bales of refuse R are then deposited into the cavity C through such access shaft 10, with the reduced pressure in such cavity assisting in drawing the bales of refuse through such shafts.

The aerobic and anaerobic bacteria are periodically introduced into the cavity C to decompose the refuse R therein and the air containing heat and noxious odors resulting therefrom is drawn by the fan 19 through the shaft 17 and purified in the air purification facility 26 before being passed into the atmosphere.

The foregoing disclosure and description of the invention are illustrative and explanatory thereof, and various changes in the size, shape and materials as well as in the details of the illustrated construction may be made without departing from the spirit of the invention.

We claim

1. A method of sanitarily disposing of refuse to reduce pollution, vermin, and other undesirable concomitants of refuse disposal facilities, comprising the steps of:
    a. unloading the refuse from a refuse collection vehicle in which the refuse has been transported to the disposal site;
    b. depositing the refuse in a substantially impermeable cylindrical solution cavity having a greater vertical depth dimension relative to the diameter dimension thereof and being formed within a subterranean rock salt formation;
    c. accumulating the refuse in the cylindrical cavity, wherein the dimensions of the cavity allow substantially complete filling of the cavity efficiently utilizing the volume of the cavity;
    d. extracting the air containing noxious odors and excess heat generated by the decomposition of such refuse in the solution cavity;
    e. purifying the air extracted from such solution cavity; and
    f. releasing the purified air into the atmosphere.

2. The method of claim 1, further including the step of: compressing the lower layers of refuse in the cavity with the more recently introduced refuse.

3. The method of claim 1, further including the step of: transporting the refuse from the vehicle to a disposal shaft leading to the solution cavity.

4. The method of claim 1, further including the step of: magnetically separating metallic elements from the refuse before depositing such refuse in the solution cavity.

5. The method of claim 1, further including the step of: compressing the refuse into bales before said step of depositing to reduce the volume occupied by such refuse.

6. The method of claim 1, further including the step of: introducing aerobic and anaerobic bacteria into the cavity to decompose the refuse in the solution cavity.

7. The method of claim 1, further including the step of: shredding the refuse before said step of depositing to reduce the volume occupied by such refuse.

* * * * *